United States Patent
Stefani et al.

(10) Patent No.: US 9,608,296 B2
(45) Date of Patent: Mar. 28, 2017

(54) ARRANGEMENT AND METHOD FOR STORING ELECTRIC ENERGY IN ELECTROCHEMICAL CELLS WITH A LARGE DIAMETER AND HIGH STORAGE CAPACITY

(75) Inventors: Frank Stefani, Dresden (DE); Tom Weier, Dresden (DE); Gunter Gerbeth, Dresden (DE)

(73) Assignee: HELMHOLTZ-ZENTRUM DRESDEN-ROSSENDORF E.V., Dresden (DE)

( * ) Notice: Subject to any disclaimer, the term of this patent is extended or adjusted under 35 U.S.C. 154(b) by 1176 days.

(21) Appl. No.: 13/634,418

(22) PCT Filed: Mar. 16, 2011

(86) PCT No.: PCT/DE2011/050007
§ 371 (c)(1),
(2), (4) Date: Nov. 9, 2012

(87) PCT Pub. No.: WO2011/113429
PCT Pub. Date: Sep. 22, 2011

(65) Prior Publication Data
US 2013/0059176 A1 Mar. 7, 2013

(30) Foreign Application Priority Data
Mar. 16, 2010 (DE) .................. 10 2010 002 931

(51) Int. Cl.
*H01M 4/36* (2006.01)
*H01M 10/39* (2006.01)

(52) U.S. Cl.
CPC ................. *H01M 10/399* (2013.01)

(58) Field of Classification Search
CPC ..................... H01M 4/36; H01M 10/399
See application file for complete search history.

(56) References Cited

U.S. PATENT DOCUMENTS

| 3,775,181 A | 11/1973 | Ryerson |
| 2008/0044725 A1 | 2/2008 | Sadoway et al. |
| 2008/0074083 A1 | 3/2008 | Yarger et al. |

FOREIGN PATENT DOCUMENTS

| GB | 2 225 667 | 6/1990 |
| JP | S51-62334 A | 5/1976 |

OTHER PUBLICATIONS

William Beaty "which way does the electricity really flow?" Available online since 1999.*

(Continued)

*Primary Examiner* — Jonathan G Leong
*Assistant Examiner* — Seenam Agbetiafan
(74) *Attorney, Agent, or Firm* — Norris McLaughlin & Marcus, P.A.

(57) ABSTRACT

An electrochemical cell assembly has electrochemical cells of large diameter and high storage capacity, making it particularly useful for stabilization of electric supply systems. The assembly includes at least one electrochemical cell composed of a layer of: a liquid metal or liquid metal alloy forming the cathode, a liquid electrolyte layer, and a layer of a liquid metal or liquid metalloid forming the anode. An electrically insulating inner tube is provided along the vertical axis of the assembly, the presence of which prevents the occurrence of the Tayler instability or other instabilities caused in the liquids by the current flow, and thus prevents the intermixing of the liquids. Another very efficient option for increasing the maximum current of the cell is that of conducting a current having a suitable direction and intensity through the interior of the inner tube.

9 Claims, 6 Drawing Sheets

(56) References Cited

OTHER PUBLICATIONS

Ruediger, Guenther et al.; "Theory of current-driven instability experiments in magnetic Taylor-Couette flows"; Physical Review E 76, 056309 (2007), pp. 1-9.
Stefani, Frant et al.; "How to circumvent the size limitation of liquid metal batteries due to the Tyler instability"; Energy Conversion and Management 52 (2011), pp. 2982-2986.
Rannacher, Dirk et al.; "Cylindrical Korteweg-de Vries solitons on a ferrofluid surface"; New Journal of Physics 8 (2006) 108, pp. 1-16.

* cited by examiner

Fig. 0001
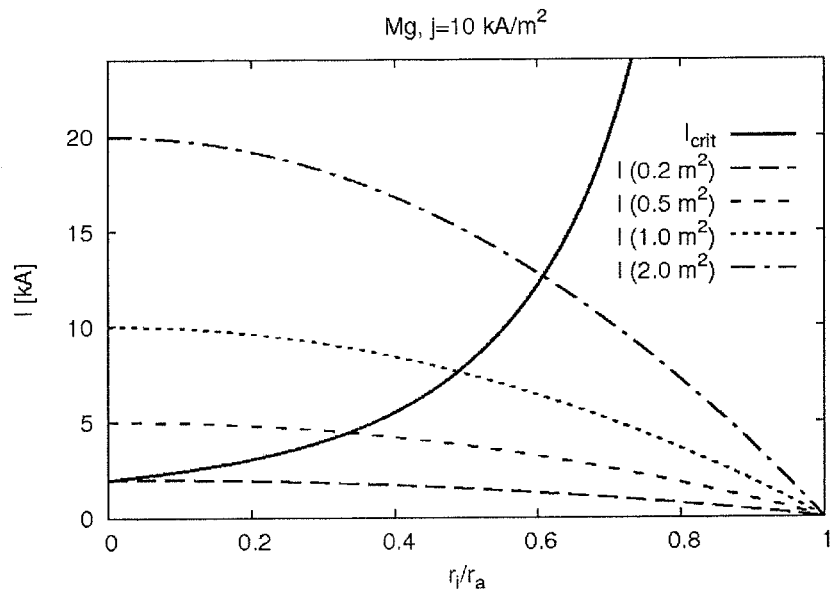
Fig. 0002
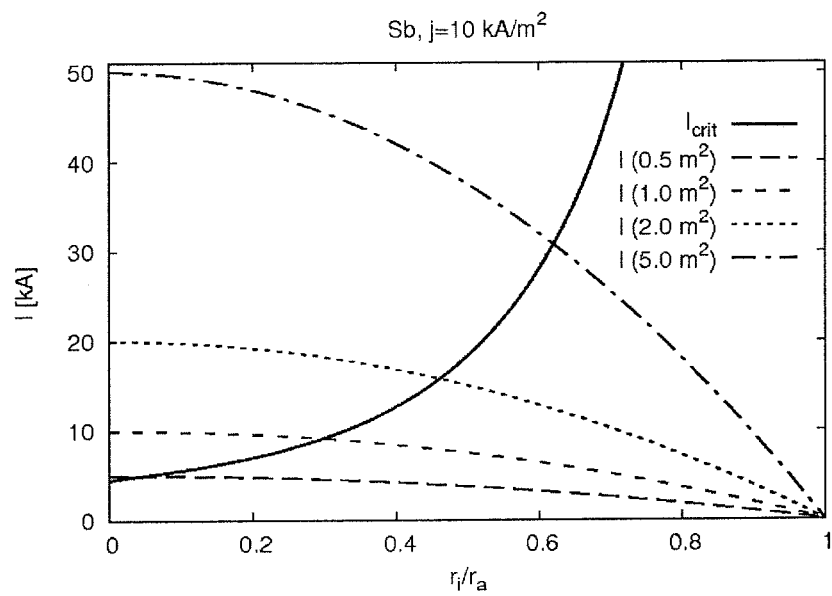

Fig. 0003
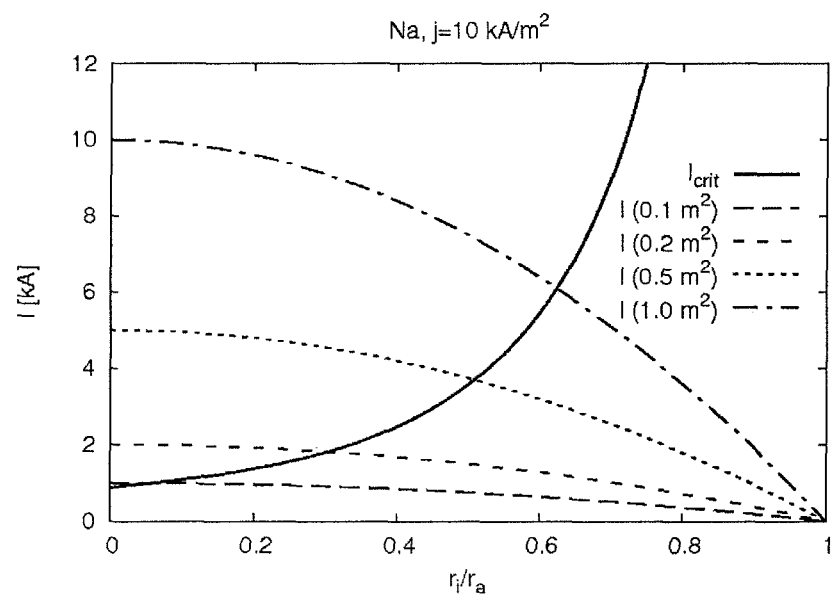
Fig. 0004
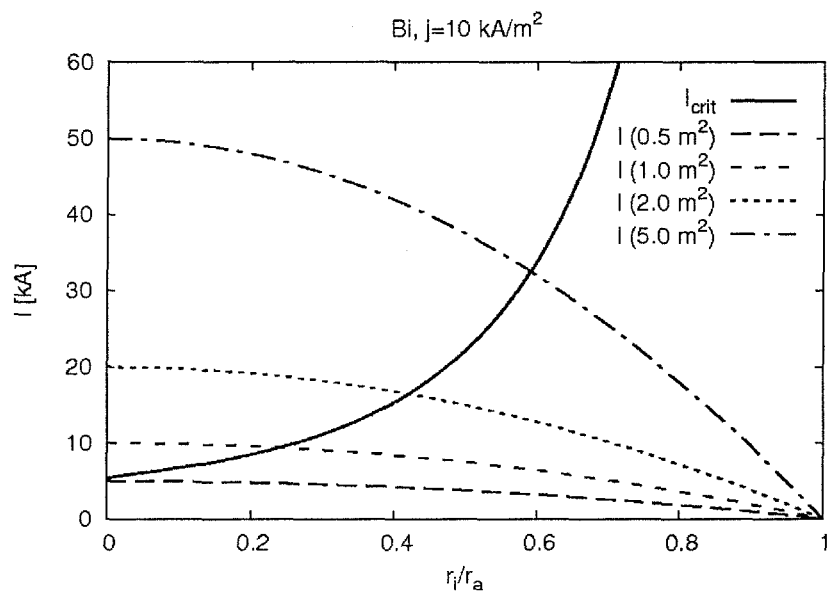

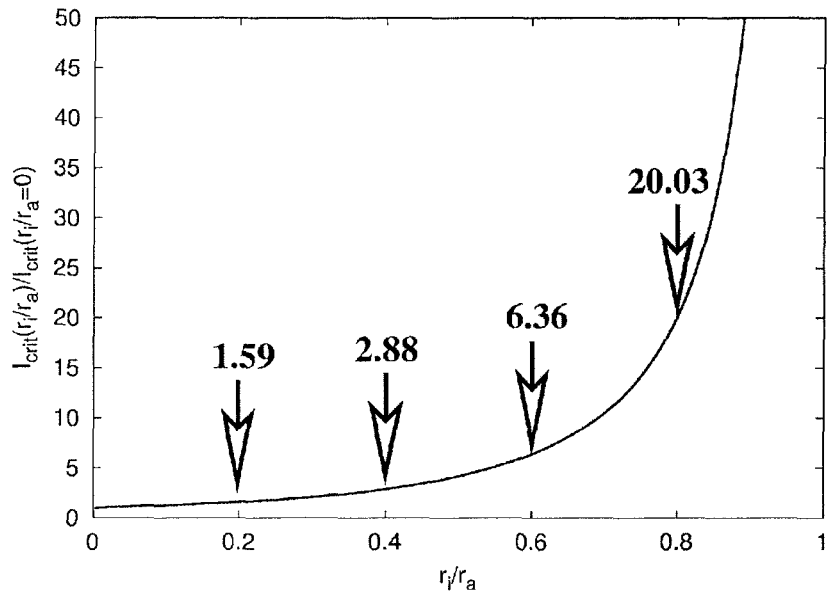
Fig. 0005
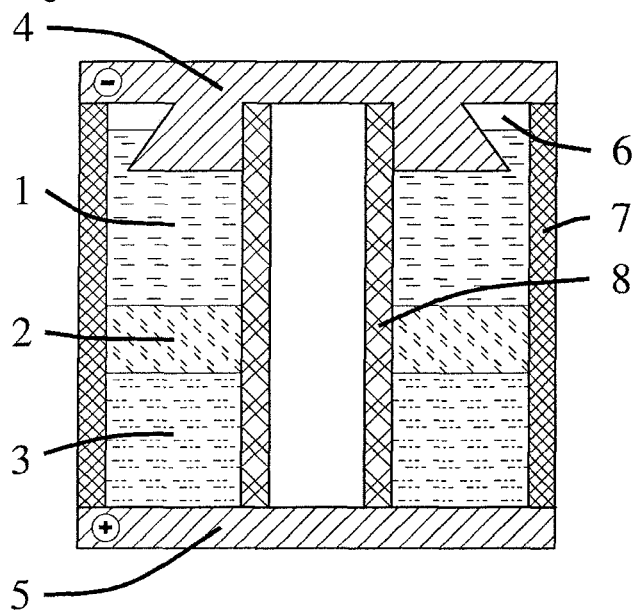
Fig. 0006

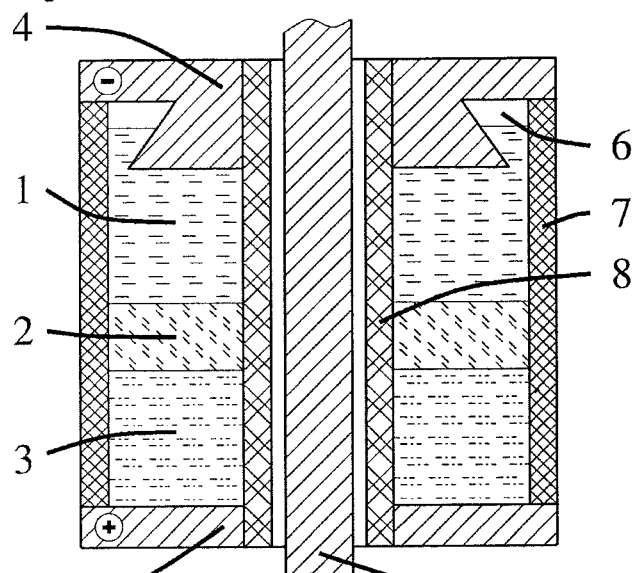
Fig. 0007
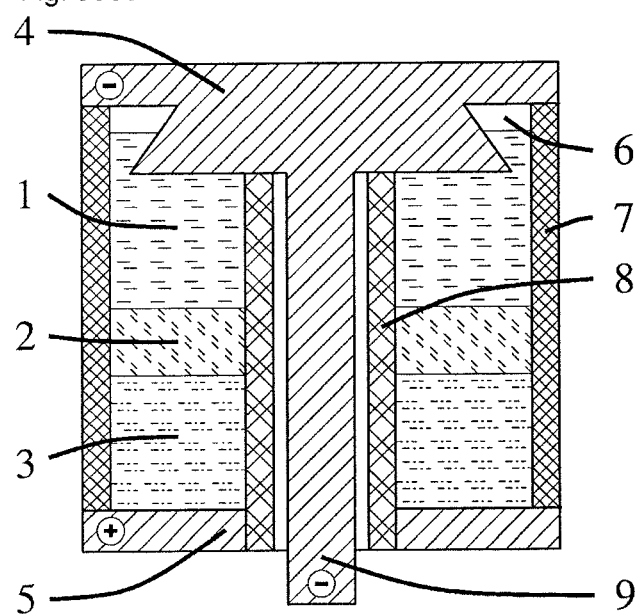
Fig. 0008

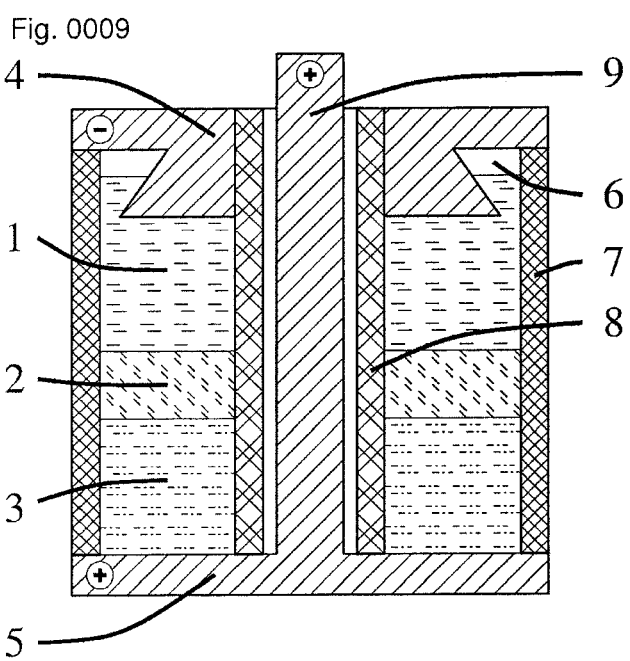
Fig. 0009

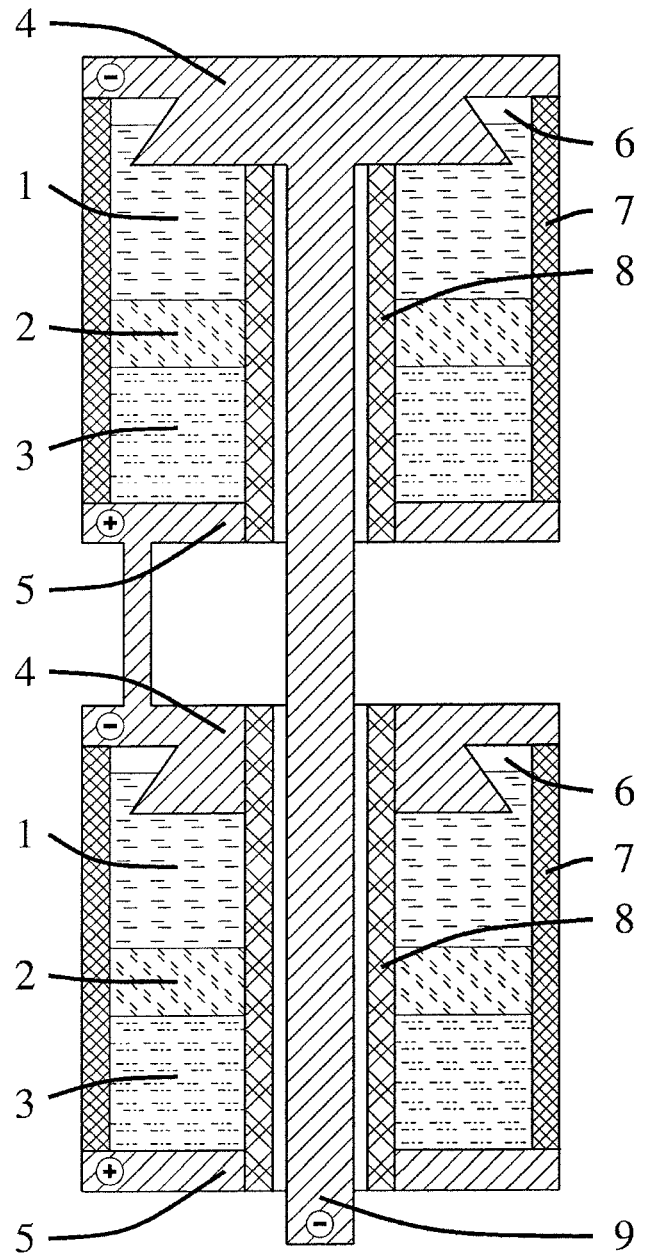
Fig. 0010

ARRANGEMENT AND METHOD FOR STORING ELECTRIC ENERGY IN ELECTROCHEMICAL CELLS WITH A LARGE DIAMETER AND HIGH STORAGE CAPACITY

BACKGROUND OF THE INVENTION

The invention relates to an assembly and to a method for storing energy in electrochemical cells having large diameters and high storage capacity. A preferred field of application of the invention is to provide energy balancing.

Reconciling the supply and demand in the provision of electric energy poses a major problem in energy management, which is further exacerbated by the intensified use of forms of renewable energy that fluctuate over time, such as wind energy and solar energy.

A variety of forms for storing energy have been proposed so as to assure the necessary daily and seasonal equalization. Traditionally, pumped storage power stations haven been utilized for this purpose, but compressed air energy storage and molten salts are meanwhile being used as well.

Electrochemical energy stores can also be used for this purpose. Since the introduction of lead storage batteries, a large number of additional systems have been created, only a relatively small portion of which has become established for practical use. The useful life, which is to say the maximum number of cycles, of storage batteries containing solid electrodes is generally limited by aging-induced changes of the electrode structures. This problem can be counteracted by using liquid electrode materials. Examples of storage batteries containing liquid electrodes include rechargeable sodium-sulfur (NaS) and sodium-nickel chloride (ZEBRA) batteries. In both systems, the electrolyte is a $\beta''$-$Al_2O_3$ ceramic, which conducts sodium ions at higher temperatures (solid electrolyte). This ceramic material is brittle and sensitive toward thermal shocks, which in practical experience limits the usable diameter of individual cells to a few centimeters. Approximately 20,000 individual cells must typically be interconnected in order to output power of 1 MW. So as not to mechanically stress the solid electrolyte, the cells should be maintained at the operating temperature (~300° C.) to as great an extent as possible over the entire useful life to ensure that the electrode materials remain liquid, and this leads to the corresponding thermal losses.

U.S. 2008044725 A 2008-02-21 proposed an electrochemical energy storage unit by which these drawbacks are supposed to be overcome. Here, metalloids or metals such as arsenic, antimony, bismuth, selenium, or tellurium, which have sufficiently high electrical conductivity in the liquid state, function as the positive electrode (conventionally designated as the "cathode" during discharging). Magnesium, potassium, sodium, lithium, calcium, cadmium, and zinc are proposed for the negative electrode (anode). An important aspect is the use of a liquid electrolyte between the anode and cathode. The materials are selected so that the density of the electrolyte is higher than that of the liquid anode material, and the density of the liquid cathode material is higher than the density of the electrolyte. Under these circumstances, natural density stratification of the materials takes place, whereby the necessity of using a porous membrane is dispensed with. This option was incidentally already indicated in U.S. Pat. No. 3,245,836 A.

The typical current density j, which can reportedly be achieved with such an assembly, is indicated in U.S. 2008044725 A 2008-02-21 as a value of 10 to 50 $kA/m^2$, with assemblies having greater current densities also being claimed.

A key drawback of the proposed assembly is the limitation of the maximum current of the cell resulting from physical principles. The arbitrary scalability claimed in U.S. 2008044725 A 2008-02-21 of quantities of several cubic meters (quote: "In one approach, scalability is exploited in a single large cell of the invention—on the order of a few meters cubed . . . ") cannot be achieved in reality. This is due to the fact that, for a given current density, the maximum diameter of the cell is limited by the onset of a known current instability in liquid conductors. This instability was first described in 1972 by Vandakurov, VANDAKUROV, Y. V., Theory for the stability of a star with toroidal magnetic field, *Soviet Astronomy*, 1972, Volume 16, pages 265-272 and in 1973 by Tayler, TAYLER, R. J., Adiabatic stability of stars containing magnetic fields. 1—Torodal fields. *Monthly Notices of the Royal Astronomical Society*, 1973, Volume 161, pages 365-380 and calculated in detail for the case of cylindrical assemblies by Rüdiger et al, RÜDIGER, G., Theory of current-driven instability experiments in magnetic Taylor-Couette flows, *Physical Review* E76, 2007, page 053309; RÜDIGER, G., Tayler instability of toroidal magnetic fields in MHD Taylor-Couette flows. *Astronomische Nachrichten* [Astronomy News] 2010, no. 331, pages 121-129. This instability, which hereafter is referred to as the Tayler instability, causes electric currents to become unstable in liquid metals if they exceed several kA (depending on the specific substance parameters). In connection with this instability, a very strong flow within the liquid metal occurs, which would result in strong intermixing of anodic, electrolytic, and cathodic materials, and thereby render the assembly unusable as an energy storage unit.

SUMMARY OF THE INVENTION

It is the object of the invention to provide an electrochemical cell for energy storage, the operating principle of which is not impaired by the occurrence of Tayler instability, even at large diameters.

The transition to larger diameters that is thus possible significantly increases the energy storage capacity of each cell and, consequently, considerably reduces costs as compared to a corresponding assembly that is composed of many cells having small diameters.

The invention is essentially based on the assumed stable stratification of the anodic, electrolytic, and cathodic liquids. For a current density (in the range of 10 to 50 $kA/m^2$) that is predetermined by the electrochemical processes, a critical diameter exists for each of the three liquids at which Tayler instability develops and results in strong intermixing of the liquids. The critical diameter of the overall assembly is determined by the smallest of the critical diameters of the liquids that are used.

The present invention is based on the fact that the onset of Tayler instability can be shifted toward considerably larger critical diameters by installing an insulating inner tube or hollow cylinder. Starting from circular cylinders in order to simplify matters, it is possible, for any given outside radius $r_a$ of the fluids and any given maximum current density j, to establish such a radius $r_i$ of the insulating inner cylinder at which a maximum overall current can be achieved under conditions where no onset of Tayler instability occurs.

The non-dimensional parameter decisive for the onset of Tayler instability is known as the Hartmann number, Ha=B $r(\sigma/\rho\,\nu)^{1/2}$, where B denotes the magnetic field generated by the current, r denotes the radius of the cylinder, σ denotes the electrical conductivity of the fluid, ρ denotes the density of the same, and ν denotes the kinematic viscosity thereof. At a particular current flow and radius, a fluid becomes Tayler-unstable sooner with higher electrical conductivities and smaller densities and kinematic viscosities.

Because the critical diameters for the electrolytes are very large due to the low electrical conductivities thereof, it is sufficient hereafter to calculate the critical diameters only for some liquid metals and metalloids that may be used as anode and cathode materials. For this purpose, the calculation method according to RÜDIGER, G., Theory of current-driven instability experiments in magnetic Taylor-Couette flows. *Physical Review* E76, 2007, page 056309 is used and applied to various substance parameters and radii ratios $r_i/r_a$. First, the combination of magnesium (anode) and antimony (cathode), which is preferred in U.S. 2008044725 A 2008-02-21, will be analyzed. The corresponding substance parameters at the indicated working temperature of 700° C. are $\sigma=3.61\times10^6$ S/m, $\rho=1.54\times10^3$ kg/m$^3$, $\nu=6.74\times10^{-7}$ m$^2$/s for magnesium and $\sigma=0.85\times10^6$ S/m, $\rho=6.45\times10^3$ kg/m$^3$, $\nu=2.01\times10^{-7}$ m$^2$/s for antimony.

For magnesium, FIG. 1 shows the critical current $I_{crit}$ as a function of the radii ratio $r_i/r_a$. In addition, the figure shows four curves that indicate the resulting overall current in the annular gap between $r_i$ and $r_a$ under conditions where the current density is 10 kA/m$^2$. For $r_i=0$ m, the critical current for the onset of Tayler instability is approximately 1.9 kA. At the assumed current density of 10 kA/m$^2$, this would equate to a critical surface area of 0.19 m$^2$, which is to say a critical radius $r_a$ of the fluid of 0.26 m. For larger radii, the Tayler instability would lead to a very strong flow inside the liquid magnesium, which would result in strong intermixing of the anodic, electrolytic, and cathodic materials and thus render the system unusable.

The assembly according to the invention is based on the monotonically growing dependence of the critical current $I_{crit}$ for the onset of Tayler instability on $r_i/r_a$. Apparently it is possible to drastically increase the critical current by introducing an insulating inner tube having the radius $r_i$. The intersecting points of the curve $I_{crit}$ with the curves of the currents for various overall surfaces $\pi r_a^2$ show that quite large critical surface areas, and thus large critical currents, can be achieved with a growing $r_i$. For example, an overall current of approximately 12.5 kA is possible for $\pi r_a^2=2$ m$^2$, if $r_i/r_a$ is selected to be approximately equal to 0.61.

FIG. 2 shows the corresponding curves for antimony, the cathode material. Because of the substance parameters, the critical current for $r_i=0$ is at approximately 4.4 kA. This demonstrates that the onset of the Tayler instability is determined by the magnesium in a cell containing magnesium as the anode material and antimony as the cathode material.

Hereafter, the case of an electrochemical cell in which sodium is used as the anode material will be analyzed. This has been proposed in U.S. Pat. No. 3,245,836 A, wherein tin was proposed as the cathode material. In addition, the likewise possible combination of sodium and bismuth will be analyzed, which due to the low melting temperatures of the two metals could operate at temperatures as low as 300° C. At this temperature, the conductivity of sodium would be particularly high, which would lead to an onset of the Tayler instability at particularly low currents.

FIG. 3 shows the critical current $I_{crit}$ as a function of the radii ratio $r_i/r_a$ for sodium at 300° C. ($\sigma=5.99\times10^6$ S/m, $\rho=0.878\times10^3$ kg/m$^3$, $\nu=3.94\times10^{-7}$ m$^2$/s). Again, four curves are shown that indicate the resulting overall current in the annular gap between $r_i$ and $r_a$ under conditions where the current density is 10 kA/m$^2$. For $r_i=0$ m, the critical current for the onset of the Tayler instability is approximately 0.86 kA. At the assumed current density of 10 kA/m$^2$, this would equate to a critical surface area of 0.086 m$^2$, which is to say a critical radius $r_a$ of the fluid of 0.16 m. The overall current can again be increased to approximately 6 kA for $\pi r_a^2=1$ m$^2$, for example, by inserting an inner cylinder, if $r_i/r_a$ is selected to be approximately equal to 0.62.

FIG. 4 shows the corresponding curves at 300° C. when assuming bismuth as the anode material ($\sigma=0.78\times10^6$ S/m, $\rho=0.03\times10^3$ kg/m$^3$, $\nu=1.72\times10^{-7}$ m$^2$/s). Here, the critical current for $r_i=0$ m is approximately at 5.3 kA. As with the combination of magnesium and antimony described above, the onset of the Tayler instability is determined by the anode material (having better conductivity) in the sodium-bismuth combination as well.

In any case, a significant increase in the critical current in the cell can be achieved by installing an insulating inner cylinder. The factor of the increase (in relation to the critical current at $r_i=0$ m) is independent of the material that is used. The dependence thereof on $r_i/r_a$ is shown in FIG. 5, with the specific values for the selected radii ratios 0.2, 0.4, 0.6, and 0.8 being shown separately.

In practical experience, the maximum possible radius of the cell that is limited by the Tayler instability must rather be regarded as an optimistic estimation, because the instability can start considerably sooner with inhomogeneous current distributions. However, the radius provides a meaningful upper limit of the diameter, beyond which a stable operation of the electrochemical cell is generally no longer possible.

Another very efficient option for increasing the maximum current of the cell is that of conducting a current that is directed counter to the current direction in the cell through the interior of the inner tube, which is assumed to be hollow. For practical reasons, either the cathode current or the anode current of the cell is a particularly obvious choice for this purpose. According to the analyses in RÜDIGER, G., Theory of current-driven instability experiments in magnetic Taylor-Couette flows, *Physical Review* E76, 2007, page 056309, in this case Tayler instability would no longer occur even for arbitrarily high currents, at least in the ideal case of infinitely long cylinders. A similarly stabilizing effect can also be achieved by a current of suitable intensity which is directed in the same current direction as that in the cell.

The specific selection of the materials for the electrodes is immaterial for the solutions for stabilizing the liquid electrodes described in the present patent. The only assumption that is made is that these are electrically easily conducting (electrical conductivity σ greater than 10$^5$ S/m) liquid metals, metalloids or the alloys thereof.

BRIEF DESCRIPTION OF THE DRAWINGS

FIGS. 1-4 are plots of critical current Icrit as a function of the ratio ri/ra (solid line) and of overall current in the annular gap between ri and ra (broken line);

FIG. 5 is a plot of the factor of increase of critical current Icrit, by providing an annular insulating tube, as a function of the ratio ri/ra;

FIG. 6 is a schematic cross-section of an assembly of the invention;

FIG. 7 is a schematic cross-section of an assembly of the invention including an electrical conductor in the inner insulating tube;

FIG. 8 is a schematic cross-section of another assembly of the invention including an electrical conductor in the inner insulating tube;

FIG. 9 is a schematic cross-section of yet another assembly of the invention including an electrical conductor in the inner insulating tube; and FIG. 10 is a schematic cross-section of a combination of two assemblies of the invention with an electrical conductor in the inner insulating tube of each.

DETAILED DESCRIPTION OF THE INVENTION

Exemplary embodiments of the assembly and of the method will be described hereafter.

The invention will be described in more detail hereafter based on five non-limiting exemplary embodiments of the assembly and one exemplary embodiment of the method.

FIG. 6 shows a representative illustration of the assembly according to the invention. This embodiment includes a liquid anode material (1), a liquid electrolyte (2), a liquid cathode material (3), a solid electrical conductor (4) in contact with the anode material, a solid electrical conductor (5) in contact with the cathode material, a compensatory volume (6), an insulating container (7), and an insulating inner tube (8). In this embodiment, energy is stored by reducing the metal ions to a liquid metal at the negative pole and oxidizing the metal or metalloid ions to a liquid metal or metalloid at the positive pole.

The insulating inner tube is used to prevent the occurrence of the Tayler instability, and thus the intermixing of the materials of which the cathode, electrolyte, and anode are made. The radius of the inner tube is selected at least large enough for the electrical currents created at a predetermined outside radius (and predetermined material parameters) to be below the critical currents indicated in FIG. 1 to FIG. 5 for the occurrence of Tayler instability.

FIG. 7 shows an expansion of the assembly according to the invention, in which a current which is directed counter to the current direction of the cell is conducted through an electrical conductor (9) in the interior of the inner tube. This creates a magnetic field configuration in which the Tayler instability no longer occurs. This applies in particular to the assemblies according to FIG. 8 and FIG. 9, in which either the anode current is conducted downward through an electrical conductor (9) in the interior of the inner tube (FIG. 8) or the cathode current is conducted upward through an electrical conductor (9) in the interior of the inner tube (FIG. 9).

FIG. 10 shows how the principle of current conduction through a conductor in the interior of the inner tube can be expanded to several combined cells. In the exemplary embodiment, the anode current of the uppermost cell is conducted downward through all cells. The two cells shown in FIG. 10 serve to illustrate the principle and can be replaced by more than two cells. The cathode current can also be conducted upward through combined cells in a corresponding manner.

It is further possible for the combined cells not to be disposed on top of one another, as shown in FIG. 10, but next to one another.

The above calculations are made using cylindrical cell assemblies for numerical reasons. It can be assumed that these assemblies, among other things, can be expanded to cuboid assemblies. In this case, it is useful for the base surface of the inner tube not to be a circular surface, but for this surface of the "inner tube" to be tailored to the base surface of the assembly, for example, to be rectangular or square. In the case of a non-cylindrical assembly, it may further be useful to divide the base surface of the assembly into sub-segments and to place an electrically insulating inner tube in each of these sub-segments, wherein the inner tube can also have a rod shape. In both instances, the ratio of the sum of the surfaces $A_{ij}$, which form the "electrically insulating inner tube/rods" in the individual sub-segments, to the total surface of the assembly $A_a$ will approximately correspond to the ratio $(r_i/r_a)^2$, if the calculations are undertaken for cylindrical assemblies with the following assumptions: $A_a \sim \pi r_a^2$ and $\Sigma A_{ij} \sim \pi r_i^2$.

According to the method for storing electrical energy, one of the assemblies according to the invention is connected to an external electrical circuit, wherein the metal cations are reduced to a liquid metal at the cathode and the metal or metalloid anions are oxidized to a liquid metal or metalloid at the anode.

The invention claimed is:

1. An electrochemical assembly for storing electrical energy, comprising
an electrochemical cell, the electrochemical cell comprising:
an anode made of a liquid metal or liquid metalloid, or a liquid metal or liquid metalloid alloy;
a liquid electrolyte; and
a cathode made of a liquid metal or liquid metalloid, or a liquid metal or liquid metalloid alloy,
the liquids of the cathode, electrolyte and anode forming respective strata in a vertical direction due to differences in respective densities thereof, and
an electrically insulating inner tube disposed within the strata along a vertical axis of the cell and spaced from an outer periphery of the liquids such that the liquids of the anode, electrolyte and cathode are arranged outside of the inner tube.

2. The assembly according to claim 1, further comprising an electrical conductor arranged in the inner tube along said axis for conducting a current in a direction counter to a current direction of the cell.

3. The assembly according to claim 2, wherein the assembly is configured for providing the current in the electrical conductor from a negative pole of the assembly.

4. The assembly according to claim 2, wherein the assembly is configured for providing the current in the electrical conductor from a positive pole of the assembly.

5. The assembly according to claim 3, comprising a plurality of the cells and wherein the electrical conductor is arranged along the vertical axis in the inner tube of each of the cells for conducting the current downward from the negative pole of one of the cells through the electrical conductor in the inner tube of each of the cells.

6. The assembly according to claim 4, comprising a plurality of the cells and wherein the electrical conductor is arranged along the vertical axis in the inner tube of each of the cells for conducting the current upward from the positive pole of one of the cells through the electrical conductor in the inner tube of each of the cells.

7. The assembly according to claim 1, further comprising an electrical conductor arranged in the inner tube along said axis for conducting a current in the same direction as a current direction of the cell.

8. The assembly according to claim 1, comprising a plurality of electrically insulating inner tubes disposed along the vertical axis of the assembly.

9. Method of operating the assembly according to claim 1 to store electrical energy from an external electrical circuit, comprising connecting the assembly to an external electrical circuit, wherein ions of the liquid metal or metal alloy of the anode are reduced to the liquid metal or liquid metal alloy at a negative pole of the assembly and ions of the liquid metal, metalloid, metal alloy or metalloid alloy of the cathode are oxidized to the liquid metal or, metalloid, metal alloy or metalloid alloy at a positive pole of the assembly.

* * * * *